(12) United States Patent
Fröhlich et al.

(10) Patent No.: US 12,181,231 B2
(45) Date of Patent: Dec. 31, 2024

(54) COOLING SYSTEM (71) Applicant: Outokumpu Oyj, Helsinki (FI)

(72) Inventors: Thomas Fröhlich, Ratingen (DE); Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 436 days.

(21) Appl. No.: 17/620,341

(22) PCT Filed: Jun. 12, 2020

(86) PCT No.: PCT/EP2020/066406
§ 371 (c)(1),
(2) Date: Dec. 17, 2021

(87) PCT Pub. No.: WO2020/254214
PCT Pub. Date: Dec. 24, 2020

(65) Prior Publication Data
US 2022/0316818 A1    Oct. 6, 2022

(30) Foreign Application Priority Data
Jun. 18, 2019 (EP) .................................. 19180751

(51) Int. Cl.
| | |
|---|---|
| *F28F 3/12* | (2006.01) |
| *B60L 50/64* | (2019.01) |
| *F28F 21/08* | (2006.01) |
| *H01M 10/613* | (2014.01) |
| *H01M 10/625* | (2014.01) |

(Continued)

(52) U.S. Cl.
CPC ............... *F28F 3/12* (2013.01); *B60L 50/64* (2019.02); *F28F 21/083* (2013.01); *H01M 10/613* (2015.04); *H01M 10/625* (2015.04); *H01M 10/6556* (2015.04); *H01M 50/204* (2021.01);

(Continued)

(58) Field of Classification Search
CPC ........ F28F 3/12; F28F 21/083; F28F 2210/10; F28F 1/025
See application file for complete search history.

(56) References Cited

U.S. PATENT DOCUMENTS

| | | | | |
|---|---|---|---|---|
| 3,623,511 A | * | 11/1971 | Levin ................. | F15D 1/04 |
| | | | | 415/224 |
| 5,084,033 A | * | 1/1992 | O'Neill ............... | A61M 25/008 |
| | | | | 604/264 |

(Continued)

FOREIGN PATENT DOCUMENTS

| | | |
|---|---|---|
| DE | 102008059947 A1 | 6/2010 |
| DE | 102012012663 A1 | 12/2013 |

(Continued)

*Primary Examiner* — Devon Russell
(74) *Attorney, Agent, or Firm* — The Webb Law Firm (57) ABSTRACT

A cooling system including a first sheet steel item having a first surface configured to accommodate one or more objects to be cooled, and a second surface joined to a first surface of a second sheet steel item forming a shell. The items may be joined by a weld, a rivet or a plurality thereof. At least one of the second surface of the first sheet steel item and the first surface of the second sheet steel item may be formed to produce one or more conduits for forming one or more channels, whereby said joining forms said channels for coolant in a space between the second surface of the first sheet steel item and the first surface of the second sheet steel item.

16 Claims, 4 Drawing Sheets

(51) Int. Cl.
   *H01M 10/6556*   (2014.01)
   *H01M 50/204*    (2021.01)
   *H01M 50/249*    (2021.01)

(52) U.S. Cl.
   CPC ....... *H01M 50/249* (2021.01); *F28F 2210/10* (2013.01); *H01M 2220/20* (2013.01)

(56) References Cited

U.S. PATENT DOCUMENTS

| | | | |
|---|---|---|---|
| 5,644,842 A * | 7/1997 | Coleman | F28F 1/025 |
| | | | 29/890.044 |
| 10,601,007 B2 | 3/2020 | Mangold et al. | |
| 11,075,416 B2 * | 7/2021 | Günther | H01M 50/204 |
| 2007/0221365 A1 * | 9/2007 | Martin | F28D 1/0478 |
| | | | 165/150 |
| 2008/0202735 A1 * | 8/2008 | Geskes | F28D 9/0043 |
| | | | 165/157 |
| 2009/0260786 A1 * | 10/2009 | Palanchon | F28F 9/02 |
| | | | 165/176 |
| 2010/0276173 A1 * | 11/2010 | Birkenstock | H02B 1/565 |
| | | | 174/50.5 |
| 2011/0212355 A1 | 9/2011 | Essinger et al. | |
| 2011/0212356 A1 | 9/2011 | Tennessen et al. | |
| 2015/0086831 A1 | 3/2015 | Haussmann | |
| 2015/0244044 A1 * | 8/2015 | Boddakayala | B60L 58/27 |
| | | | 165/80.4 |
| 2015/0345875 A1 * | 12/2015 | Vallee | F28F 13/14 |
| | | | 165/178 |
| 2016/0018169 A1 * | 1/2016 | Powell | F28D 21/0003 |
| | | | 165/109.1 |
| 2016/0359211 A1 * | 12/2016 | Kenney | H01M 10/6557 |
| 2017/0047624 A1 | 2/2017 | Gunna et al. | |
| 2017/0176108 A1 | 6/2017 | Palanchon et al. | |
| 2018/0062224 A1 | 3/2018 | Drabon et al. | |

FOREIGN PATENT DOCUMENTS

| | | |
|---|---|---|
| DE | 102015217810 A1 | 3/2017 |
| WO | 9001659 A1 | 2/1990 |
| WO | 2005080902 A1 | 9/2005 |
| WO | 2016096329 A1 | 6/2016 |
| WO | 2018024483 A1 | 2/2018 |

* cited by examiner

COOLING SYSTEM

CROSS-REFERENCE TO RELATED APPLICATIONS

This application is the United States national phase of International Application No. PCT/EP2020/066406 filed Jun. 12, 2020, and claims priority to European Application No. 19180751.0 filed Jun. 18, 2019, the disclosures of which are hereby incorporated by reference in their entirety.

FIELD OF THE INVENTION

The invention relates to a cooling system formed from stainless sheet steel which surfaces are joined to form channels for heat transfer between the stainless sheet steel items The invention also relates to a method for manufacturing such a cooling system.

BACKGROUND

Parallel to the development of the automobile with combustion engines at the end of the 19th century, researchers also developed electric vehicles, like Werner von Siemens with his electrically powered carriage (1882). Because of their significantly greater range, availability and the price of the fossil fuels as well as the quick refueling process, passenger cars with combustion engines dominated the 20th century. With the end of the 20th century and the changing conditions like price increases and increasing scarcity of fossil fuels, electric vehicles are experiencing a renaissance.

In general, electric drive vehicles use an electric drive combined with entrained energy storage as a drive concept. Depending on the respective drive concept, electric drive vehicles can be divided into Battery Electric Vehicles (BEV) using purely electric power, Hybrid Electric Vehicles (HEV), Plug-in Hybrid Electric Vehicles (PHEVs) or Range Extended Electric Vehicles (REEV) combining an electric motor with a combustion engine. Also Fuel Cell Vehicles (FCV) or Fuel Cell Hybrid Vehicles (FCHV) where the chemical energy stored in the form of hydrogen is changed into electric energy are one additonal group of electric vehicles. As an energy storage system, high-voltage batteries (accumulators) like lithium ion batteries are used as a base cell and then interconnected to modules. Various modules are joined or interconnected to form the final vehicle battery. The vehicle battery is protected by a battery compartment, also called battery housing, battery pack, battery case or battery cover.

In addition to increasing the battery range and protecting batteries in the case of crashes and intrusions, the topic of cooling the vehicle battery is becoming more and more important. The degree of efficiency for temperature-sensitive lithium-ion drive batteries amounts about 95%. The remaining 5% represents lost heat which must be lead away especially under higher surrounding temperatures or during high-voltage loading because at battery temperatures over 35° C. the charging capacity of the batteries decreases and the aging process is speeded-up. The background is that the degradation of the cell chemistry is accelerated and reduces the component lifetime. There is a direct relation between temperature and chemical reaction: The higher the temperature, the faster is the reaction. From state of the art Battery Electric Vehicles, it is known that more than 7,000 battery cells are integrated into a battery compartment which increases the lost heat. In general, cooling systems for battery compartments can be divided into direct and passive systems, depending on the location and contact of the cooling system with the battery modules. A direct cooling system which is integrated into the battery compartment and has direct, more efficient contact with the battery cells or battery modules is known from the US patent application publication No. US2011/212356, where a cooling pipe is interposed between different rows of battery cells having a direct contact to them. Another way to set up a cooling system would be an indirect one surrounding the battery compartment, mostly located under the battery compartment, and therefore indirectly cooling the whole compartment. The main disadvantage of direct cooling systems is the case of leakage during which a fluid could get into direct contact with the energized batteries with the potential danger of short circuit of the batteries and a resulting fire. For indirect cooling systems, there is no direct contact between a cooling medium like water during a crash situation, meaning the systems are separated from each other. Further, the accessibility for direct cooling systems is more challenging. A further advantage of the indirect cooling design is that an easier access is given, e.g. during repair or for the replacement of components. Also, after a crash or an impact, separated systems enable a faster replacement of single components without having to destroy the complete system. From the viewpoint of the cooling medium, different systems are known in the state of the art: air cooling or liquid cooling with different kinds of fluids like water, coolant or refrigerant. The ideal temperature of the batteries which is the aim of the thermal management, can be defined as between 15° C. and 35° C., more preferably between 20 and 30° C.

An example of a passive, indirectly working thermal system is given in the international patent application WO 2005080902A1 where a cover plate designed with internally located pipes is cooling but not heating an attached member on the upper surface. Another example of a cooling plate is mentioned in the international patent application WO 2016096329A1 whereby in this case the cooling plate is intended as a mounting plate. Additionally, US patent application 2015/244044A1 describes a kind of a cooling plate, in this case named a thermal plate manifold. DE patent application 102008059947A1 describes a heat conduction plate connected with the single battery cells. US patent application 2017047624A1 discloses fluid channels inside a monolithic body, sidewalls or the said base, optionally with added cooling ribs. The last mentioned patent application can be categorized as a cooling plate. Such plates have the disadvantage of being material intensive which results in a great weight of the whole battery system, indirectly decreasing the battery range. Further, there is a high loss of material because the channels are manufactured out of monolithic full materials. The total volume of the later cooling channels represents scrap. Further, the manufacturing by material-losing technologies like drilling, turning, milling or eroding represents not economically manufacturing possibilities for an automotive high-volume production combined with required short cycle times. Moreover, pipe-intensive cooling constructions mean a material-intensive design with package disadvantages and a high number of necessary joining operations, especially welding.

A further way of manufacturing such cooling plates is to create them as a cast component with integrated channel structured. One example is given in the DE patent application 102015217810A1.

Furthermore, as one main condition, the limited package of the battery compartment must be considered for passenger cars with an electric drive mostly arranged in the underbody area of the vehicle. In the state of the art, mostly aluminum extruded or press-drawn profiles are used with their natural benefits of having complex forms. Also die-cast aluminum is used to create cast cooling channels into the structure of a battery compartment. One example for an extensive use of extruded aluminum profiles is given in the international patent application WO 2018024483A1, where profiles as hollow-chamber elements are used as heat exchangers to create a temperature control device inside a battery compartment. The device uses a fluid and is divided into different tempering cells having in each case a heat exchanger surface with the individual battery modules. Again, the thermal system is not separated from the battery cells consequently in a case of a leakage and the system is intensive for assembling and space.

The DE patent application 102012012663A1 describes a compartment, especially a battery compartment, which is set together by a trough, a cover and a separator element which is positioned inside the trough and for which a material is used that is preferably different from the material used for the trough. The DE patent application 102012012663A1 describes, for a trough, lightweight materials like fiber-reinforced plastic with a low thermal conductivity.

Further, the trough is on at least one side structured with protrusions or hollows.

In US patent application publication No. 2018/062224 is disclosed a battery holder for an electric vehicle comprising a trough and a cover, whereby a cooling system is integrated in the bottom of the trough. Various designs and flow patterns are shown, including parallel circuits for individual battery units mounted within the holder.

The space between the structured area of the trough and the separator element can be used for leading a cooling fluid. Especially during an impact situation, an internally arranged separator element causes disadvantages, because fluid and battery cells can come into contact and destroy the installed battery cells. The same results in leakage situations because of incomplete or damaged sealing. As a consequence, a shell with its natural sealing to protect the battery modules from any external media including the cooling fluid is desirable. Furthermore, using expensive and not crash-safe lightweight materials like fiber-reinforced plastics increases the component costs and therefore the vehicle costs, lowering the safety at the same time. Moreover, the manufacturing of such materials for the mentioned application is not suitable for high volume production and offers only slow cycle times.

In the state of the art, there exist different solutions with die-cast aluminum, extrusion profiled aluminum or other lightweight materials like fiber-reinforced plastics. But a simple, cost-effective system using the benefits of flat metallic sheets, especially using the benefits of corrosion-, acid- and thermal resistant stainless steels as flat sheets for the cooling system, is not available. Moreover, there exists in the state of the art no solutions to use the specific processing characteristics of stainless steels like formability or welding properties to enable new design possibilities for package-saving cooling systems in electric drive vehicles. Further, a way to use flat metallic sheets with their benefit of cost-effective high-volume and well-established forming processes for automotive mass production is not offered.

In relation to a profile or bending-intensive compartment design, one benefit of a deep-drawn shell construction for a battery compartment is that thermal joining processes like welding or brazing could be avoided and therefore risks because of thermal distortion or contamination with welding splatters or traces of powder. Furthermore, internal thermal stresses can be also avoided as well as leakage problems due to welding cracks or incomplete fusion. In the state of the art, no solution is available for a cooling system supporting the benefits of a shell construction as a battery compartment.

SUMMARY OF THE INVENTION

According to a first aspect, the invention relates to a cooling system comprising a first sheet steel item having a first surface configured to accommodate one or more objects to be cooled and a second surface joined to a first surface of a second sheet steel item forming a shell. At least one of the second surface of the first sheet steel item and the first surface of the second sheet steel item have been formed to produce one or more conduits for forming one or more channels. The joining forms channels for coolant in a space between the second surface of the first sheet steel item and the first surface of the second sheet steel. The channels comprise one or more inlet manifolds for coolant, a number of outlet manifolds for cooling. The number of outlet manifolds is equal to one or more than the one or more inlet manifolds. Each channel is connected to one or more inlet manifolds and one or more outlet manifolds. The number of outlet manifolds being equal to one more than the one or more inlet manifolds.

According to a second aspect, the invention relates to a method for manufacturing a cooling system. The method comprises the steps of providing a first sheet steel item comprising an essentially planar area having a first surface configured to accommodate one or more objects to be cooled and a second surface, providing a second sheet steel item having a first surface and a second surface, forming at least one of the first and second sheet steel items to produce a pattern of conduits, and joining the first surface of the second sheet steel item to the second surface of the first sheet steel item, thereby forming channels for a cooling fluid between the sheet steel items. According to a third aspect, the invention relates to a use of austenitic stainless steel in the method. According to a fourth aspect, the invention relates to the use of austenitic stainless steel in a cooling system. Fifth, sixth and seventh aspects relate to uses of a cooling system.

DESCRIPTION OF THE INVENTION

The object of the present invention is to eliminate some drawbacks of the prior art and to provide a cooling system. In an embodiment the cooling system is an indirect and liquid filled cooling system. In a further embodiment the cooling system is a cooling system for a battery compartment of electric drive vehicles which is manufactured by deep drawing or cold-rolling of flat stainless sheet steels whose surfaces are joined in a subsequent step after forming together to form channels for heat transfer between the stainless sheet steel items. Indirect cooling system means in the case of the present invention that the battery modules are separated from the cooling channels by using the stainless sheet steels and that there is no contact between the liquid cooling media and the batteries themselves.

In an embodiment the cooling system comprises a first sheet steel item having a first surface configured to accommodate one or more objects to be cooled, and a second surface joined to a first surface of a second sheet steel item forming a shell. In an embodiment the join may be a weld or a rivet or a plurality thereof. In one embodiment at least one of the second surface of the first sheet steel item and the first surface of the second sheet steel item have been formed to produce one or more conduits for forming one or more channels, whereby said joining forms said channels for coolant in a space between the second surface of the first sheet steel item and the first surface of the second sheet steel. In a further embodiment the coolant is a liquid in a still further embodiment the coolant is a gas. In one embodiment the channels comprise one or more inlet manifolds for coolant and a number of outlet manifolds for cooling. In a particular embodiment the number of outlet manifolds is equal to one more than the one or more inlet manifolds. For example, in the case that there are two inlet manifolds, the number of outlet manifolds would be three, and similarly in the case that there are three inlet manifolds, the number of outlet manifolds would be four and so on. In an embodiment each channel is connected to one or more inlet manifolds and a number of outlet manifolds, wherein the number of outlet manifolds is equal to one more than the one or more inlet manifolds as described above.

In a preferred embodiment the one or more inlet manifolds is positioned in the longitudinal centre between the first sheet steel item and the second sheet steel item. In a particular embodiment the inlet manifold is preferably located in the centre of an array of objects to be cooled. From this inlet manifold, individual partial circuits for every object to be cooled area are branched off and lead to outlet manifolds which are preferably located on the lateral outside.

In one embodiment the circuits comprise bends in the channels, said channels having an internal radius at the upstream end of the bend greater than the internal radius of the channels at the downstream end of the bend. The difference in internal radii provides a system in which the velocity of the coolant, be it liquid or gas is, in the channels is increased that the downstream end of the bend compared to the upstream end of the bend. Expressed in other words, the velocity of the coolant in the channels is decrease at the upstream end of the bend compared to the downstream end of the bend. This provides for a uniform steady flow of coolant in the channels which in turn provides for improved cooling of objects to be cooled with the cooling system. Compare the flow of coolant in the channels of such an embodiment to an individual in a water park travelling along an enclosed water slide. When the radius in a bend is small, the individual in the water slide is pushed into the outer boundary of the curve. With an increased radius, the individual would not be pushed into the outer boundary of the curve. Nature itself solves such problems by increasing the width of a river as it meanders.

In a further embodiment, the channels have an enlarged outside radius as well as an enlarged inner side radius in the cross flow direction at the upstream end of the bend. For example, in an embodiment the diameter in the pipe bend is the same or substantially the same as the diameter in the straight pipe area, which helps maintain the velocity of the coolant in the channels at the upstream end of the bend compared to the downstream end of the bend. In a particular embodiment the cooling system indirectly enables a constant temperature range between 20° C. and 35° C. for objects to be cooled. In a preferred embodiment the cooling system indirectly enables a constant temperature range between 20° C. and 35° C. for battery modules which are located inside a battery compartment.

In a particularly preferred embodiment, the sheet steel is austenitic stainless steel. In cooling systems as described in embodiments herein, austenitic steel is particularly advantageous. In addition to all of the advantages provided generally using sheet steel in a cooling system, austenitic steels are generally non-magnetic. They have good formability and weldability as well as excellent toughness. Austenitic grades also have a low yield stress and relatively high tensile strength. Austenitic grades are generally more durable and corrosion resistant than other grades.

The objects to be cooled can be selected from a diverse range from many walks of life. In one embodiment the first surface of the first sheet steel is configured to accommodate one or more objects to be cooled selected from the group consisting of individual battery modules, battery cells, engine components and control units. Cooling systems such as these may be adapted to cool and/or protect such objects to be cooled during transportation and/or when they are not in use.

Further embodiments relate to a method of manufacturing a cooling system. In a first embodiment, the method comprises the steps of providing a first sheet steel item comprising an essentially planar area having a first surface configured to accommodate one or more individual objects to be cooled and a second surface. The second surface may be on the same side of the essentially planar area or the second surface may be on the opposite side of the essentially planar area e.g. on a second side of the first sheet steel. The first embodiment of the method of manufacture comprises the further steps of providing a second sheet steel item having a first surface and a second surface, forming at least one of the first and second sheet steel items to produce a pattern of conduits, and joining the first surface of the second sheet steel item to the second surface of the first sheet steel item, thereby forming channels for a cooling fluid between the sheet steel items. This method of manufacturing a cooling system provides a cooling system in which one surface of the cooling system is conductively contacted with at least one surface of the objects to be cooled. The one surface of the cooling system is in turn a first surface of a channel containing a cooling fluid, which may be a liquid or a gas. Thus, a system is provided which maximises contact for heat transfer directly between the object to be cooled and the cooling fluid.

As described above, the cooling system may be adapted to various objects to be cooled. In one embodiment the method is adapted to provide a method of manufacturing a cooling system for the cooling of objects to be cooled selected from the group consisting of individual battery modules, battery cells, engine components and control units.

In one embodiment the method comprises manufacturing a cooling system for a battery compartment of an electric drive vehicle, preferably an electric drive vehicle selected from the group consisting of electric passenger transport system, electric goods transport systems, electric buses, electric commercial vehicles, electric taxis, electric parcel delivery vehicles, railway systems and ships.

In a preferred embodiment, the method comprises manufacturing a cooling system for a storage system, such as a tank or a container for battery modules, battery cells, engine components and control units. Such a system may be used for cooling and or protecting objects to be cooled such as battery modules, battery cells, engine components and control units, during transportation and/or when not in use.

Further embodiments of the method relate to forming the first and second sheet steel. In one embodiment the method comprises deep drawing one or more of the first and the second sheet steel items.

In a particular embodiment the method comprises cold rolling one or more of the first and the second sheet steel items. In a preferred embodiment the first sheet may be deep drawn or cold rolled and the second sheet may be deep drawn or cold rolled. In one embodiment the first sheet is deep drawn and the second sheet is cold rolled. In a further embodiment the first sheet is cold rolled and the second sheet is deep drawn. The forming method used on each of the sheets may be the same or may be different. In one embodiment, for example, one of the sheets is not formed by deep drawing or cold rolling e.g. not formed at all.

In an embodiment the method comprises continuously cold rolling the second sheet steel item to produce a repetitive series of conduits.

In a further embodiment the method comprises cutting the cold rolled material to length to obtain components for separate cooling systems.

Cooling systems comprise channels of various shapes and sizes as e.g. can be seen from FIGS. 1 to 7. In an embodiment the method comprises forming bends in the channels, said channels having an internal radius in the crossflow direction at the upstream end of the bend greater than the internal radius of the channels at the downstream end of the bend. That is, an outer side and an inner side of each channel each have a first radius of curvature in a crossflow direction in an upstream end of the bend and a second radius of curvature in a crossflow direction in a downstream end of the bend, the first radius of curvature of the outer side is larger than the second radius of curvature of the outer side and the first radius of curvature of the inner side is larger than the second radius of curvature of the inner side, a curvature of the outer side and a curvature of the inner side of each channel are each asymmetrical about a longitudinal axis of the bend (see FIG. 5). The difference in internal radii provides a system in which the velocity of the coolant, be it liquid or gas is, in the channels is increased that the downstream end of the bend compared to the upstream end of the bend. Expressed in other words, the velocity of the coolant in the channels is decrease at the upstream end of the bend compared to the downstream end of the bend.

In a further embodiment, the channels have an enlarged outside radius as well as an enlarged inner side radius in the cross flow direction at the upstream end of the bend. For example, in an embodiment the diameter in the pipe bend is the same or substantially the same as the diameter in the straight pipe area, which helps maintain the velocity of the coolant in the channels at the upstream end of the bend compared to the downstream end of the bend.

Austenitic stainless steel provides at least the advantages described above over other suitable materials that may also be used in a cooling system. Thus, in an embodiment the method comprises providing stainless sheet steel items that are austenitic stainless sheet steel items.

Uses of a cooling system as well as uses of austenitic steel are also described herein. One embodiment comprises the use of austenitic stainless steel in a method for manufacturing a cooling system as described herein. A preferred embodiment comprises the use of austenitic stainless steel in a cooling system described herein. A particular embodiment comprises the use of a cooling system as described herein in a battery compartment of an electric drive vehicle. A further embodiment comprises the use of a cooling system as described herein in an electric drive vehicle, preferably an electric drive vehicle selected from the group consisting of electric passenger transport system, electric goods transport systems, electric buses, electric commercial vehicles, electric taxis and electric parcel delivery vehicles. One embodiment comprises the use of a cooling system as described herein in a storage system for battery modules, battery modules, battery cells, engine components and/or control units.

A further embodiment relates to a cooling system described herein obtainable by a method of manufacturing as described herein.

Figure 1:
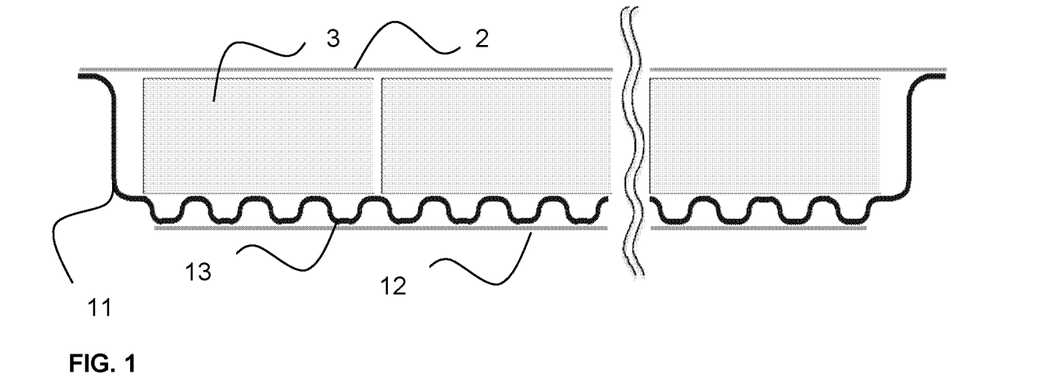
FIG. 1 is a side view of an embodiment manufacturing the inventive cooling system by deep-drawing of the battery compartment.

With a view to the above-mentioned advantages of a shell construction, according to an embodiment the cooling system is directly integrated into the deep-drawing process of a first stainless sheet steel item representing the deep-drawn battery compartment shell and having a three-dimensional shape forming a pattern of open conduits. In a second step, this first deep drawn stainless sheet steel item is joined together in the area of its formed pattern of open conduits on its outer surface with a second flat stainless sheet steel to create conduits and channels for heat transfer between both stainless sheet steels. To enable deep-drawing of a shell with an integrated cooling system, a defined distance I between the radii of the cooling system and the bending radius of the battery compartment must be arranged, having a value in the range $12.0 \text{ mm} \leq l \leq 18.0 \text{ mm}$. Further, the radius r for the partial cooling circuits is required to enable on the one hand a sufficient formability of the radii and on the other hand a suitable flow of cooling liquid, and should be therefore deep-drawn with a value in the range $2.5 \text{ mm} \leq r \leq 9.0 \text{ mm}$. The deep-drawing could be performed in different drawing steps, but to have a cost-efficient manufacturing process, in as few steps as possible. Optionally, a trimming of the deep-drawn components may be integrated. FIG. 1 illustrates the set-up of such a cooling system.

Figure 2:
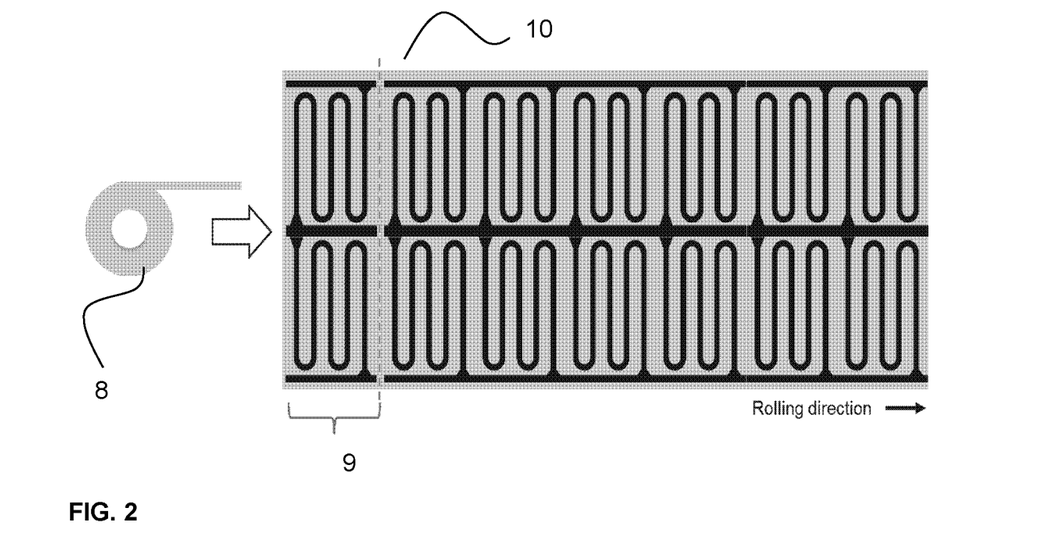
FIG. 2 is a top view of another embodiment of the manufacturing of the inventive cooling system by forming.

Another preferred way of manufacturing the cooling system using the method of the present invention would be to provide a first stainless sheet steel item comprising an essentially planar area having a bottom surface and a top surface capable of accommodating at least one individual battery module. Then in a second step, a second stainless sheet steel item is formed by cold-rolling to produce a pattern of conduits. In a third step, the second stainless sheet steel item is joined together with the first stainless sheet steel item forming channels for heat transfer between both stainless sheet steel items. The second stainless sheet steel item can be produced as a repetitive part by continuous cold-rolling of a flat coil or strip as shown in FIG. 2. The repetitive parts include an inlet manifold section, an outlet manifold section s and at least one closed individual partial circuit. The system is formed by two cold-rolling rolls during a final cold-rolling step of the semi-finished material in the rolling direction of the coil, so that cutting to length can be executed after at least one repetitive part, depending on customer requirements such as the desired length for a battery compartment. This way of manufacturing can further decrease component costs because the process and investment for the deep-drawing process is omitted. Further, the process is scalable to different dimensions and therefore suitable for different vehicle classes. That makes manufacturers of flat metallic sheets for this application field more competitive related to extruded profiles or die-cast products.

The battery modules being located inside the shell and covered from the environmental by using a closing plate joined together with the deep-drawn shell. The cooling system of the present invention is preferably positioned with the battery compartment on its largest side to enable the best cooling behavior, in most cases represented by the bottom or upper side of the compartment. To enable easier access during repair or replacement situations, the positioning of the cooling system is preferably at the bottom side of the compartment.

The cooling system in the case of the present invention comprises at least one inlet manifold, a number of outlet manifolds which is equal to the number of inlet manifolds plus one, and individual partial circuits for every battery module area, which circuits are connected with one inlet and one outlet manifold. Thereby, a battery module area is defined in the method of the present invention as the contact area where the battery modules are located inside the battery compartment. According to the present invention, the inlet manifold is preferably located in the centre of the battery module array. From this inlet manifold, individual partial circuits for every battery module area are branched off and lead to outlet manifolds which are preferably located on the lateral outside.

Figure 5:
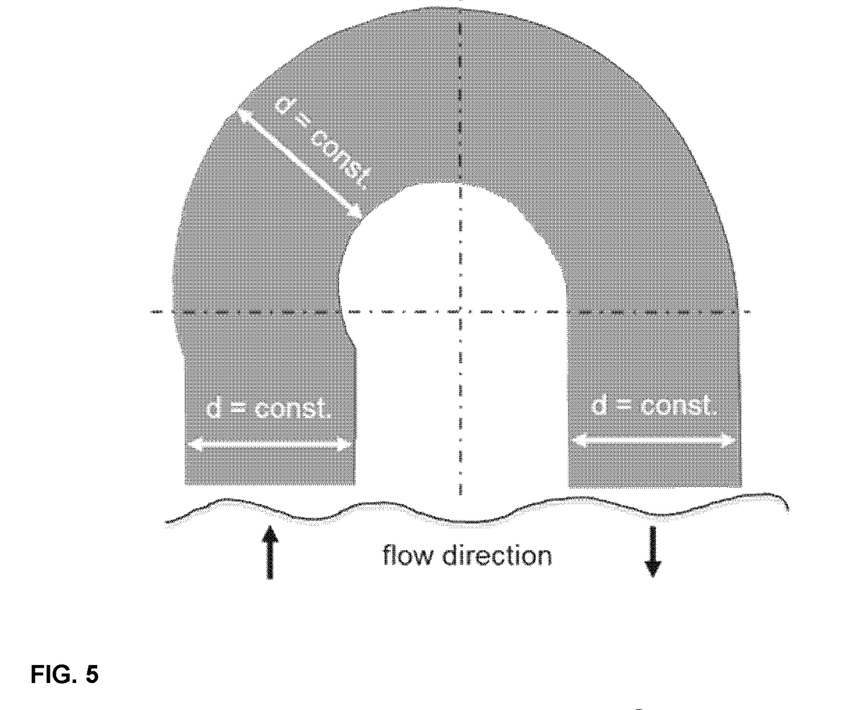
FIG. 5 is a detailed top view of a pipe bend as generally FIG. 3.
Figure 6:
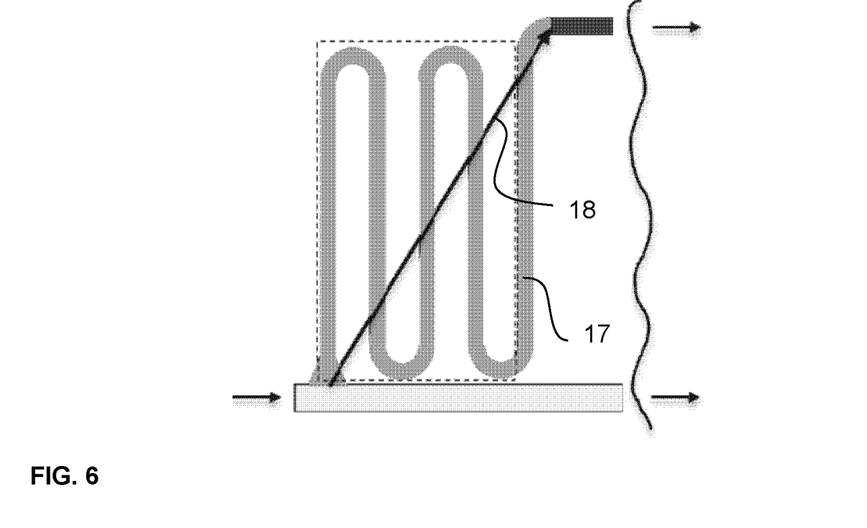
FIG. 6 is a top view of the sinuosity P of an individual partial circuit.

Every partial circuit of a battery module area is connected to one inlet manifold and one outlet manifold. Further, the partial circuits are preferably arranged as a meandering design to enable effective cooling of the battery module area, pointed out in FIGS. 2, 3, 6, 7. Thereby, the term of sinuosity, well-known e.g. from rivers, can be used to define an amount for the intensity of meandering of the flowing system. It is illustrated in FIG. 6. The sinuosity P can be defined by formula (1):

$$P = L/D \quad (1)$$

whereby L represents the total flow length of one partial circuit divided by the direct distance D between the starting and the end point of the relevant partial circuit. The sinuosity for the partial circuits should have a value $P \leq 6$. For an effective fluid flow and to avoid imperfections, the number of bends inside the partial circuits must be reduced to a minimum. Therefore, the definition of a ratio $r_{b/l}$ defined with formula (2) is introduced:

$$r_{b/l} = b/L \quad (2)$$

whereby b represents the number of bends inside an individual partial circuit and is divided by its total flow length L. A suitable value can be achieved with $r_{b/l} \leq 0.3$. Furthermore, it is suitable to create during forming of the stainless sheet steel an enlarged section in the crossflow direction at the upstream end of the bend shown in FIG. 5. For this purpose, the outside as well as the inner side of the first curve section is enlarged in its radius to enable an increase of the flow velocity and therefore to increase the cooling effect. For the method of the present invention, it is possible to add this feature without further effort because it needs only be integrated into the forming step of the stainless sheet steel item.

A flowing fluid is used and is preferably water, ideally with defroster additives, a coolant or a refrigerant. One preferred cooling medium is a water-glycol mixture.

As a preferable material selection, stainless steels are used to fulfil the method of the present invention because of their corrosion, heat and acid resistance, high formability in general and high deep-drawn-ability, high recyclability and worldwide availability as flat sheets combined with the experience from deep-drawing applications like kitchen sinks over decades. Thereby the thickness of the flat metallic sheets is $t \leq 3.0$ mm, more preferably 0.4 mm $\leq t \leq 1.5$ mm to provide a tight but lightweight and cost-efficient cooling system construction. For the case of the present invention, it is preferably to use an austenitic stainless steel having a natural and repassivating corrosion resistance because of its chromium-oxide passivation layer and having an elongation of $A_{80} \geq 50\%$ to enable the forming of the cooling system with the mentioned distances and radii.

For the method of the present invention, the mentioned joining process for creating the channels is prepared by bonding to seal the channels and avoid leakage of the cooling fluid. The bonding could be performed with well-known adhesives like cold-curing two-component adhesives (2k) or hot curing single component adhesives (1k). In general, cost-effective systems with a fast curing process and without the necessity of further heat input should be preferred.

The functionality of the battery compartment is independent from the mounting position within the electric drive vehicle. Preferably, the battery compartment is located over the whole underbody to ensure a maximum battery range, a low centre of gravity and balanced driving dynamics. Localized constructions like one-side compartments, front or rear-positioning will also work. In these cases, the dimensions of the cooling system of the present invention can be adjusted for different forms or required package solutions.

In general, the method of the present invention is applicable to various mobile systems or transportation systems using battery modules located in a battery compartment. With adjustment and scaling, the present invention also works for other types of electric passenger or goods transport systems like electric buses, electric commercial vehicles, electric taxis or vehicles for parcel delivery. It is appropriate to use one battery compartment for one vehicle. But especially for long haul transportation like goods transport with trucks as one example, various battery compartments can be integrated into the vehicle to increase the range. Another reason to create different compartments with different supporting housings could be the limitation of the available coil and plate width or the maximum dimension of the tooling for the shell. In this case, the cooling system of the present invention can be integrated as a plural solution for every compartment but also as one single solution. The cooling effect of the present invention works independently from the type of the used accumulator inside, such as nickel-cadmium, nickel-metal hydride, lithium ion or lithium air batteries.

EXAMPLES

FIG. 1 illustrates a battery compartment designed as a deep-drawn shell 11 with a closing plate 2 where the battery modules 3 are located inside. The cooling system is directly integrated during deep-drawing of the shell. An additional flat closing plate 12 is attached to the bottom side of the shell whereby a space 13 between the formed floor of the battery compartment 11 and the additional closing plate system 12 is created and represents the cooling circuit.

FIG. 2 illustrates the manufacturing of the cooling system implemented by continuous cold-rolling of a flat coil 8 or strips, whereby repetitive parts 9 of the cooling system are continuously rolled in in the rolling direction of the coil so that a cutting to length 10 can be executed after at least one repetitive part 9.

Figure 3:
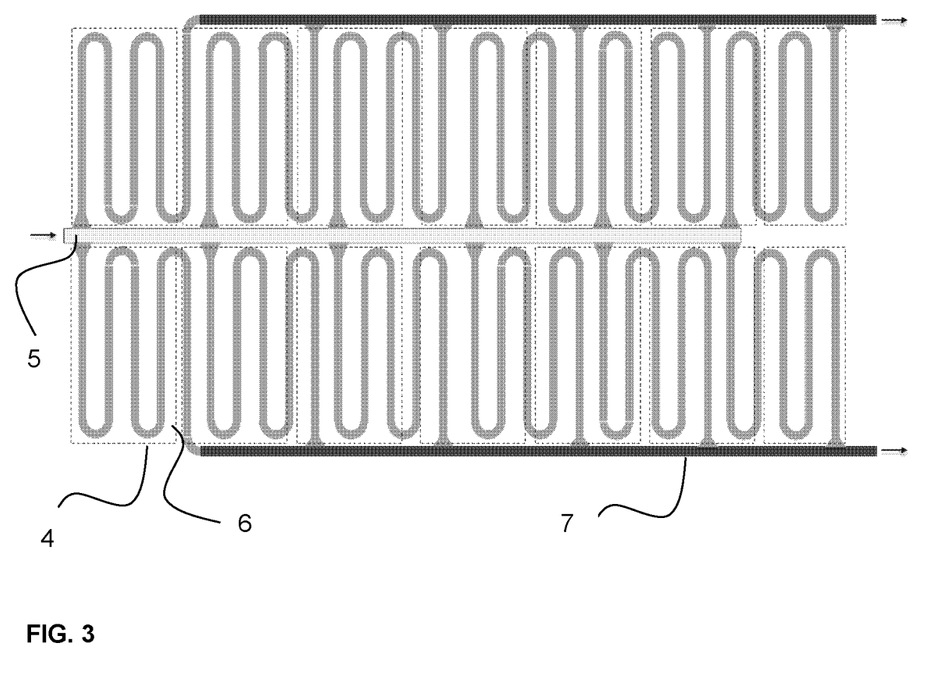
FIG. 3 is a top view of the inventive cooling system of FIG. 1.

FIG. 3 illustrates the cooling system of FIG. 1 in a top view, whereby the dotted lines represent the battery module area 4 where the battery modules are located on the floor of the battery compartment. In the centre of the battery modules is located one manifold for the inlet 5, from which manifold individual partial circuits 6 for every battery module area are branched off and lead to, in this case, two outlet manifolds 7. Accordingly, this satisfies the design rule that the number of manifolds for the outlet must be equal to the number of inlet manifolds plus one. Every partial circuit of a battery module area is connected to one inlet manifold and one outlet manifold.

Figure 4:
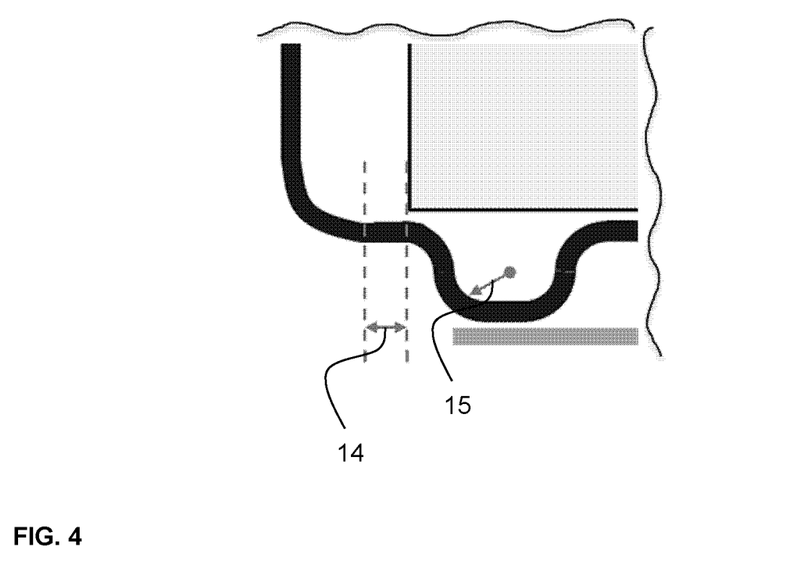
FIG. 4 is a detailed side view of a portion of the inventive cooling system of FIG. 1.

FIG. 4 illustrates a detail of FIG. 1, whereby a defined distance 14 between the radii of the cooling channels and the bending radius of the battery compartment is arranged. Further, a defined radius 15 for the partial cooling circuits is required to enable on the one hand a sufficient formability of the radii and on the other hand a suitable flow of the cooling liquid.

FIG. 5 illustrates a detailed view of FIG. 3 whereby the pipe bends of the partial circuit 16 are having in their outside as well as their inner side an enlarged radius in the crossflow direction at the upstream end of the bends.

FIG. 6 illustrates the definition of sinuosity P of an individual partial circuit whereby sinuosity is a measure of the intensity of meandering of the flowing system and defined as the total length of the partial circuit 16 divided by the direct distance between starting point and end point of the partial circuit 17.

Figure 7:
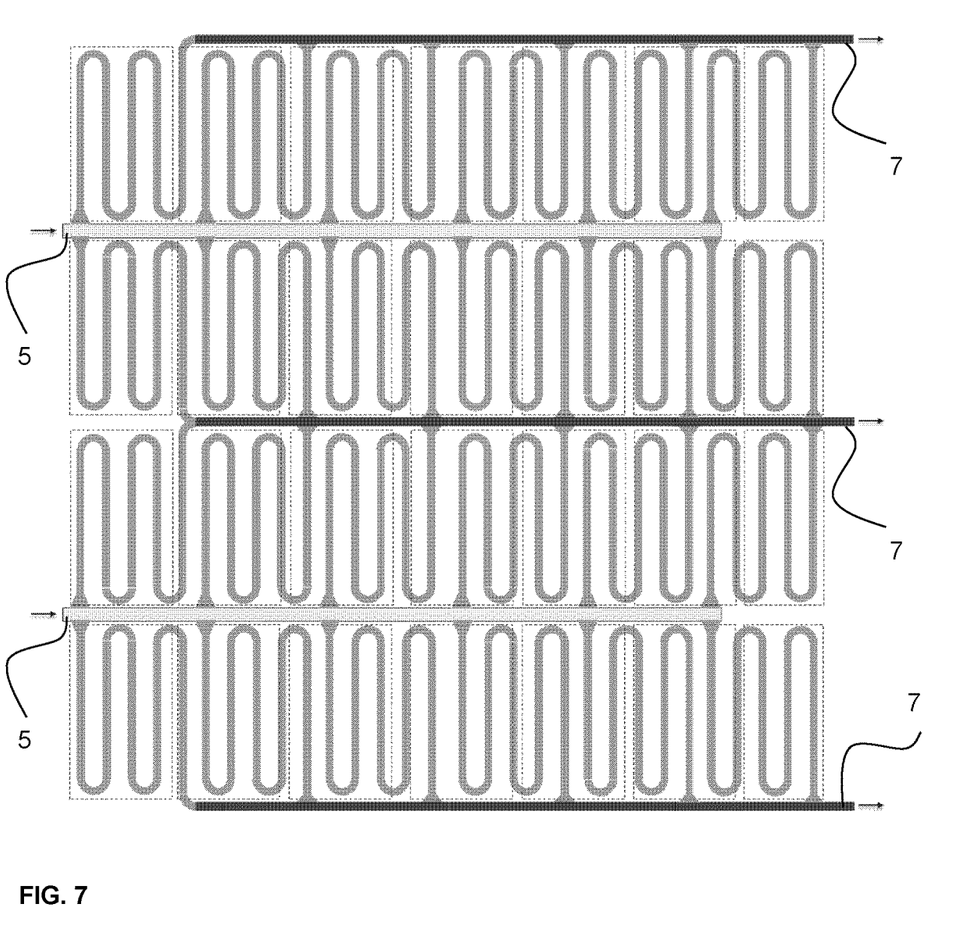
FIG. 7 is a top view of a further embodiment of the inventive cooling system.

FIG. 7 illustrates another preferred embodiment of the cooling system using the manufacturing method of the present invention so that the number of outlet manifolds 7, in this FIG. 2, is equal to the number of inlet manifolds 4, in this FIG. 3, plus one. Every partial circuit of a battery module area is connected to one inlet manifold and one outlet manifold.

The invention claimed is:

1. A cooling system comprising:
   a first sheet steel item having a first surface configured to accommodate one or more objects to be cooled, and a second surface; and
   a second sheet steel item forming a shell,
   wherein the second surface of the first sheet steel item is joined to a first surface of the second sheet steel item, and
   at least one of the second surface of the first sheet steel item and the first surface of the second sheet steel item have been formed to produce one or more conduits for forming one or more channels, whereby said joining forms said channels for coolant in a space between the second surface of the first sheet steel item and the first surface of the second sheet steel item, said channels comprising:
   one or more inlet manifolds for coolant,
   a number of outlet manifolds for coolant, wherein the number of outlet manifolds is equal to one more than the number of inlet manifolds,
   whereby each channel is connected to one or more inlet manifolds and one or more outlet manifolds, and wherein the conduits comprise bends, an outer side and an inner side of each conduit each have a first radius of curvature in a crossflow direction in an upstream end of the bend and a second radius of curvature in a crossflow direction in a downstream end of the bend, the first radius of curvature of the outer side is larger than the second radius of curvature of the outer side and the first radius of curvature of the inner side is larger than the second radius of curvature of the inner side, and a curvature of the outer side and a curvature of the inner side of each conduit are each asymmetrical about a longitudinal axis of the bend.

2. The cooling system according to claim 1, wherein the inlet manifolds are positioned in a longitudinal centre between the first sheet steel item and the second sheet steel item.

3. The cooling system according to claim 1, wherein the first sheet steel item and/or the second sheet steel item comprise austenitic stainless steel.

4. The cooling system according to claim 1, wherein the first surface of the first sheet steel item is configured to accommodate one or more objects to be cooled selected from the group consisting of individual battery modules, battery cells, engine components and control units.

5. A method for manufacturing a cooling system according claim 1, comprising:
   providing a first sheet steel item comprising an essentially planar area having a first surface configured to accommodate one or more individual objects to be cooled and a second surface,
   providing a second sheet steel item having a first surface and a second surface,
   forming at least one of the first and second sheet steel items to produce a pattern of conduits,
   joining the first surface of the second sheet steel item to the second surface of the first sheet steel item, thereby forming channels for a cooling fluid between the sheet steel items.

6. The method according to claim 5, wherein the objects to be cooled are selected from the group consisting of individual battery modules, battery cells, engine components and control units.

7. A battery compartment of an electric drive vehicle comprising a cooling system manufactured according to the method of claim 5.

8. A storage system comprising a cooling system manufactured according to the method of claim 5.

9. The method according to claim 5, comprising deep drawing one or more of the first sheet steel item and the second sheet steel item.

10. The method according to claim 5, comprising cold rolling one or more of the first sheet steel item and the second sheet steel item.

11. The method according to claim 10, comprising continuously cold rolling the second sheet steel item to produce a repetitive series of conduits.

12. The method according to claim 10, further comprising cutting the cold rolled material to length to obtain components for separate cooling systems.

13. The method according to claim 5, further comprising forming bends in the channels, said channels having in an outer side as well as in an inner side an enlarged radius in a crossflow direction at an upstream end of the bend.

14. The method according to claim 5, wherein the first sheet steel item and/or the second sheet steel item comprise austenitic stainless steel.

15. A battery compartment of an electric drive vehicle comprising a cooling system according to claim 1.

16. A storage system for battery modules, battery cells, engine components and/or control units comprising a cooling system according to claim 1.

* * * * *

UNITED STATES PATENT AND TRADEMARK OFFICE
CERTIFICATE OF CORRECTION

| | | |
|---|---|---|
| PATENT NO. | : 12,181,231 B2 | Page 1 of 1 |
| APPLICATION NO. | : 17/620341 | |
| DATED | : December 31, 2024 | |
| INVENTOR(S) | : Fröhlich et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 465 days.

Signed and Sealed this
Thirteenth Day of May, 2025

Coke Morgan Stewart
*Acting Director of the United States Patent and Trademark Office*